United States Patent [19]

Liang

[11] Patent Number: 5,750,021

[45] Date of Patent: May 12, 1998

[54] OIL SUPPLY AND RETURN TUBE STRUCTURE FOR OIL TANKS IN CARS AND SHIPS

[76] Inventor: Chung-Ho Liang, 2/F., No. 66, Sec. 2, Cheng-Tai Rd., Wu-Ku Village, Taipei County, Taiwan

[21] Appl. No.: 753,480

[22] Filed: Nov. 26, 1996

[51] Int. Cl.[6] ............................................. B01D 35/027
[52] U.S. Cl. .......................... 210/86; 210/172; 210/196; 210/462; 210/472; 210/493.3
[58] Field of Search .................... 210/86, 172, 196, 210/462, 472, 493.3; 340/450.2, 450.3, 624

[56] References Cited

U.S. PATENT DOCUMENTS 3,113,282  12/1963  Coleman ............................. 210/86
3,266,312  8/1966  Coleman et al. ................... 210/86
4,617,122  10/1986  Kruse et al. ...................... 210/493.3
5,186,152  2/1993  Cortochiato et al. .............. 210/172

Primary Examiner—Matthew O. Savage
Attorney, Agent, or Firm—Morton J. Rosenberg; David I. Klein; Jun Y. Lee

[57] ABSTRACT

An oil supply and return tube structure for oil tanks in cars and ships includes a base having a large oil return hole, a large oil intake hole, a small oil intake hole, a small oil return hole, an air inlet and a float hole to allow dimensional and wavy filtering of oil in the oil tank. By means of a float in conjunction with a sensor in a float shaft, the oil level may be detected. An air discharge valve is provided for adjustment of air pressure in the oil tank. A sinuous tube is provided to protect the sensor in the float shaft.

2 Claims, 7 Drawing Sheets

5,750,021

OIL SUPPLY AND RETURN TUBE STRUCTURE FOR OIL TANKS IN CARS AND SHIPS

BACKGROUND OF THE INVENTION (a) Field of the Invention

The present invention relates generally to an oil supply and return tube structure for oil tanks in cars and ships, and more particularly to an oil supply and return tube which is simple to install and is not vulnerable to damage as well as has good filter effects.

(b) Description of the Prior Art

Conventional oil tubes of oil tanks in cars and ships are provided with an oil amount detection device to inform the user the amount of oil at any time. The structure of the oil tube comprises an oil intake tube, an oil return tube, and air vents, etc. The tube couplings of the conventional oil tubes are fitted with plastic sleeves before being glued in place, which is time-consumptive and affects the production quality. Besides, the sinuous tube without fastenings in the conventional oil tube is vulnerable to damage. The filter mesh structure is also a single planar structure. If impurities block the mesh, the flow of the oil will be affected.

SUMMARY OF THE INVENTION

Accordingly, a primary object of the present invention is to provide an oil supply and return tube structure for oil tanks in cars and ships having the following advantages: 1. One end of the coupling is provided with threads to facilitate connection and save assembly time to enhance production efficiency; 2. the sinuous tube is provided with fastenings so that it may not be easily bent or damaged; and 3. the filter mesh is configured to be a three-dimensional wavy structure to increase the filter surface and prevent blocking.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
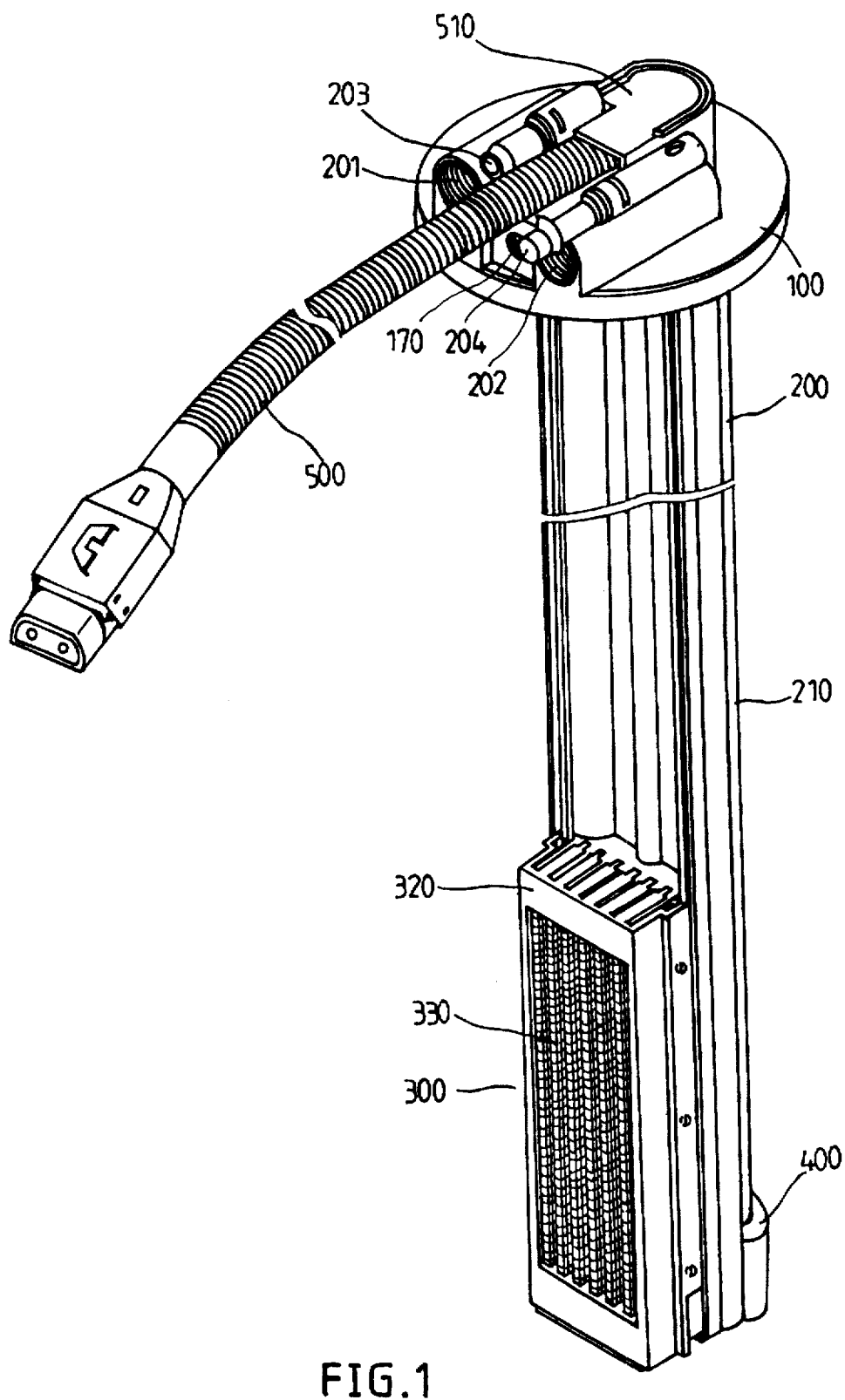
FIG. 1 is an elevational view of the present invention.
Figure 2:
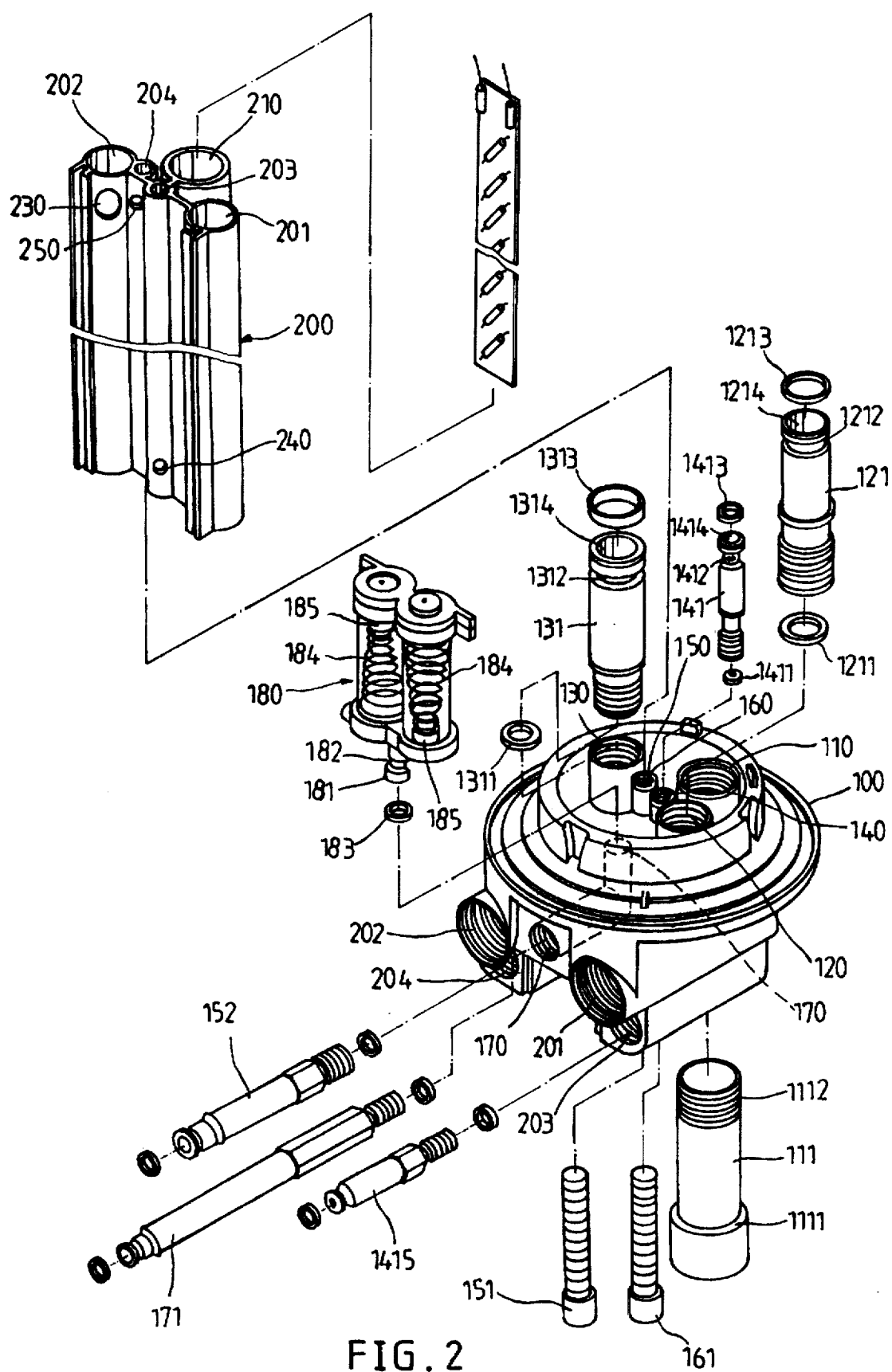
FIG. 2 is an exploded view of the present invention placed in an inverted position.
Figure 3:
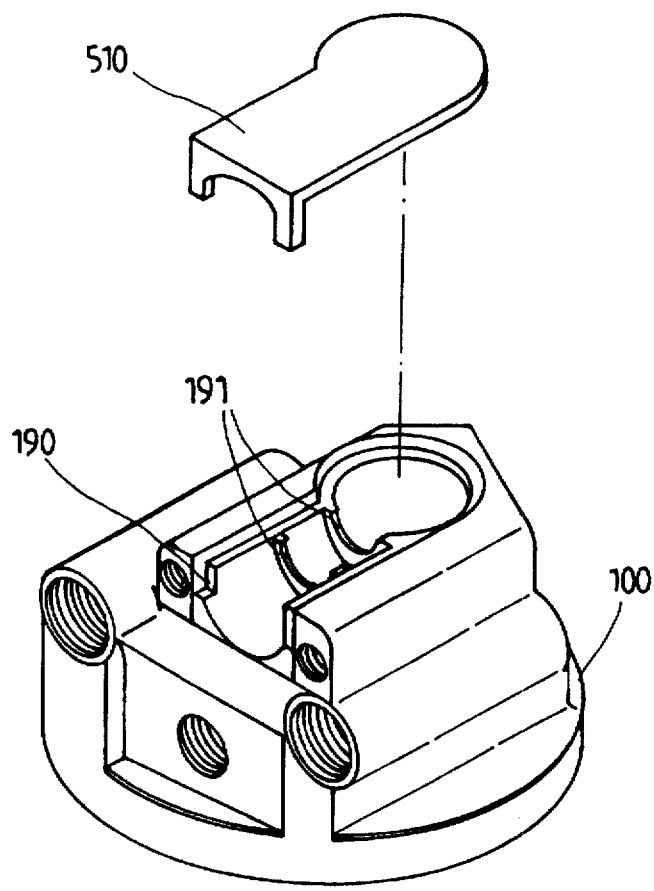
FIG. 3 is an exploded view of the upper portion of the base of the invention.
Figure 4:
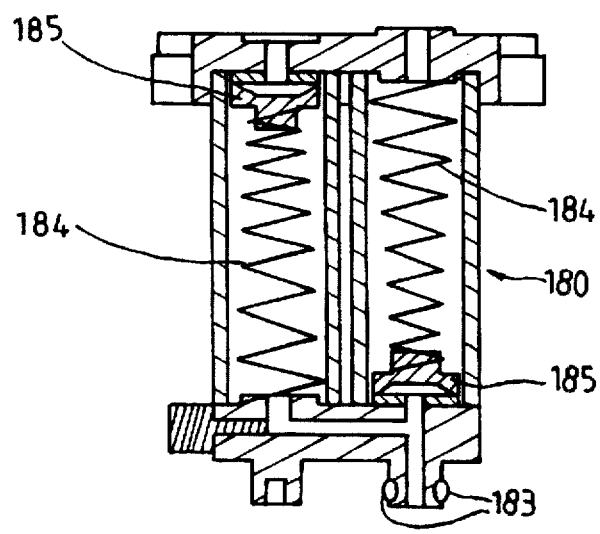
FIG. 4 is a sectional view of the air discharge valve of the invention.

With reference to FIG. 1, the present invention essentially comprises a base 100, a metal conduit 200 and a filter mesh means 300. As shown in FIGS. 2–5, a bottom side of the base 100 is provided with a float hole 110, a large oil intake hole 120, a large oil return hole 130, a small oil intake hole, 140, a small oil return hole 150, a securing screw hole 160, and an air inlets 170. The upper end communicates with the lower end so that the intake oil, return oil and air may freely flow. The float hole 110 together with a securing screw rod 111 secures the base 100 and the metal conduit 200 as an integral whole. By using a first screw rod 121, a second screw rod 131, a third screw rod 141, a fourth screw rod 151 and a fifth screw rod 161, the base 100 and the metal conduit 200 are firmly joined together. The securing screw rod 111 is a hollow structure with an upper end provided with a stepped rim 1111 and a lower end provided with threads 1112. Before the first screw rod 121 is screwably inserted into the float hole 110, it is fitted with a ring 1211 to prevent leakage after tightening. A lower end thereof is also fitted with a groove 1212 at a suitable position for fitting therein a ring 1213. It is further provided with a hollow through hole 1214. The second screw rod 131 has an upper end provided with a ring 1311 and a lower end provided with a groove 1312 at a suitable position for fitting therein a ring 1313, and is further provided with a hollow through hole 1314. The third screw rod 141, likewise, has an upper end provided with a ring 1411 and a lower end provided with a groove 1412 at a suitable position for fitting therein a ring 1413. It further has a hollow through hole 1414 for the passage of oil. The air inlet 170 has a lower end provided with an air discharge valve 180 which has an upper end provided with an air intake nozzle 181 and a groove 182 for receiving a ring 183. By means of a conical spring 184 disposed therein and a piston 185, adjustment control of air pressure is achieved. The sinuous tube 500 according to the present invention serves as a protective means for a sensor planted in a float shaft or conduit 210. By means of a cap 510 retained in a retain groove 190, the cap pressing the sinuous tube, and by means of a fastening rib 191 at an upper end of the base 100, the sinuous tube 500 may be fastened in place and may not be easily pulled or damaged. The base 100 is provided with a return oil rod 152, an intake oil rod 1415 and an air intake rod 171 respectively at its upper end so that it may fit the sleeve.

Figure 9:
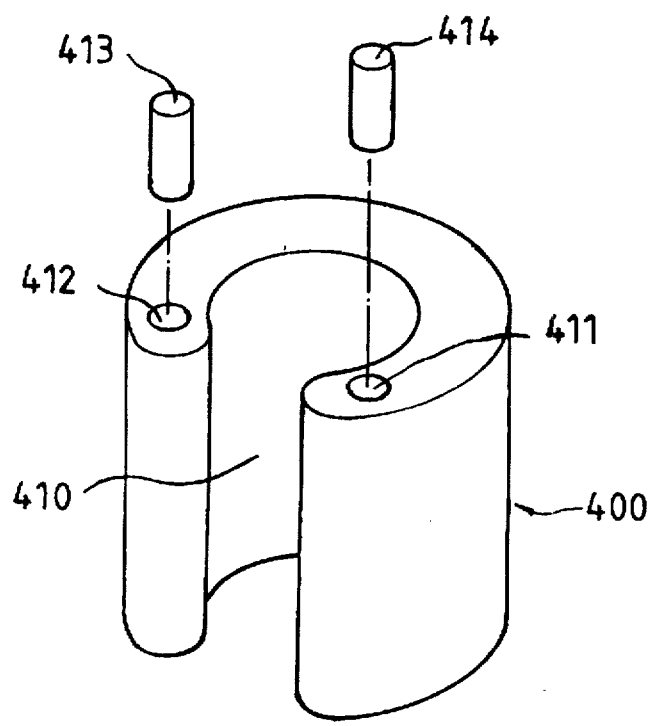
FIG. 9 is an exploded view of the float of the invention.
Figure 10:
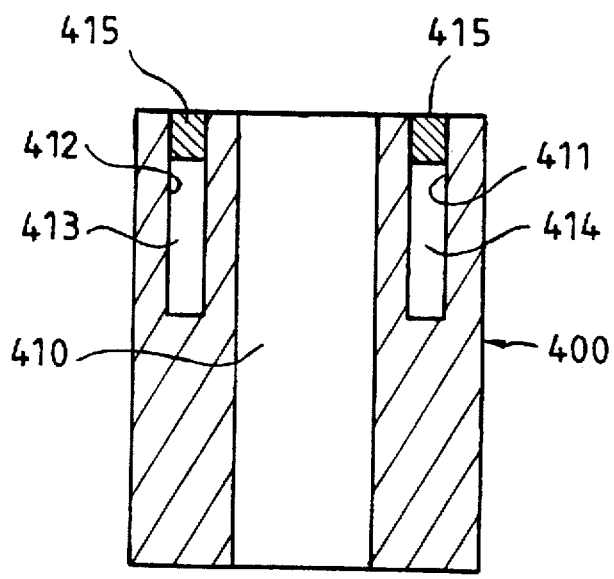
FIG. 10 is a sectional view of the invention.

With reference to FIG. 1, 9 and 10, a float 400 is provided with two holes 411, 412, each at either side of front rim portion of a top side thereof. Each hole has a magnet 413 (414) disposed inside. The top portions of the holes 411, 412 are sealed with an epoxy resin 415. The center of the float 400 is provided with a C-shaped groove 410 for fitting onto the float shaft 210 and enabling the float 400 to float or sink with the amount of oil. By means of the detector of a sensor circuit in the float shaft 210, the oil level may be obtained.

Figure 5:
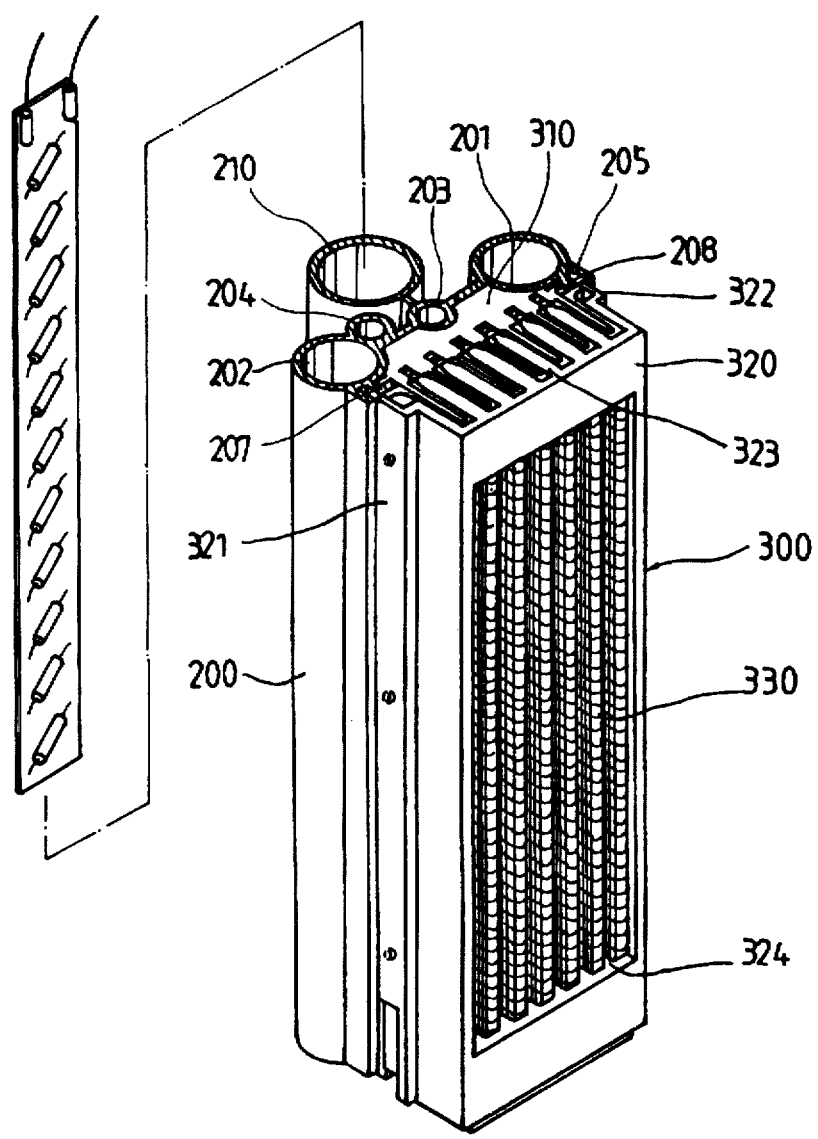
FIG. 5 is an elevational view of the filter means of the invention.
Figure 6:
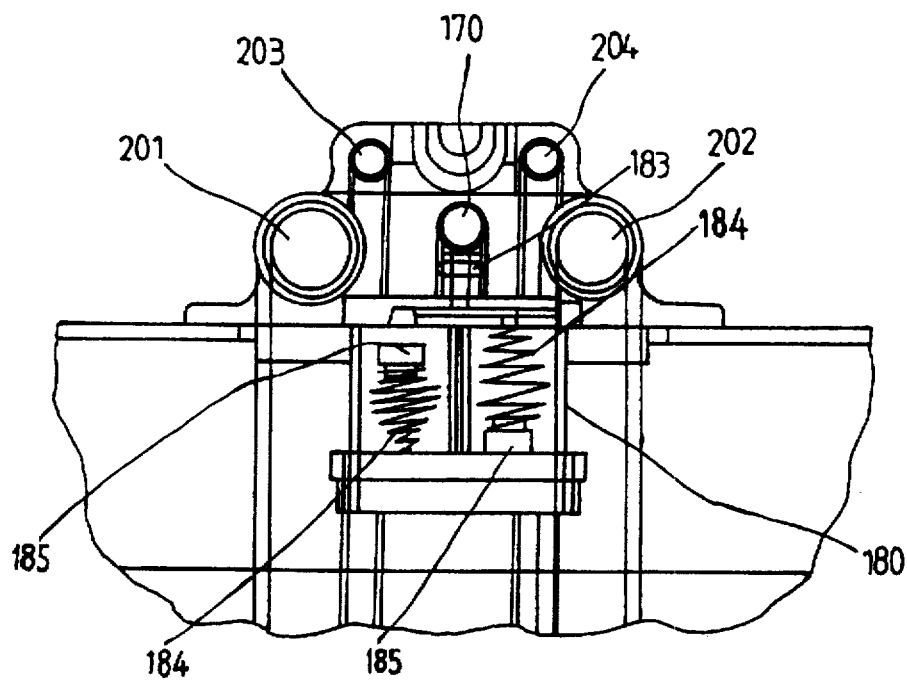
FIG. 6 illustrates the actions of the base and the air discharge valve.
Figure 7:
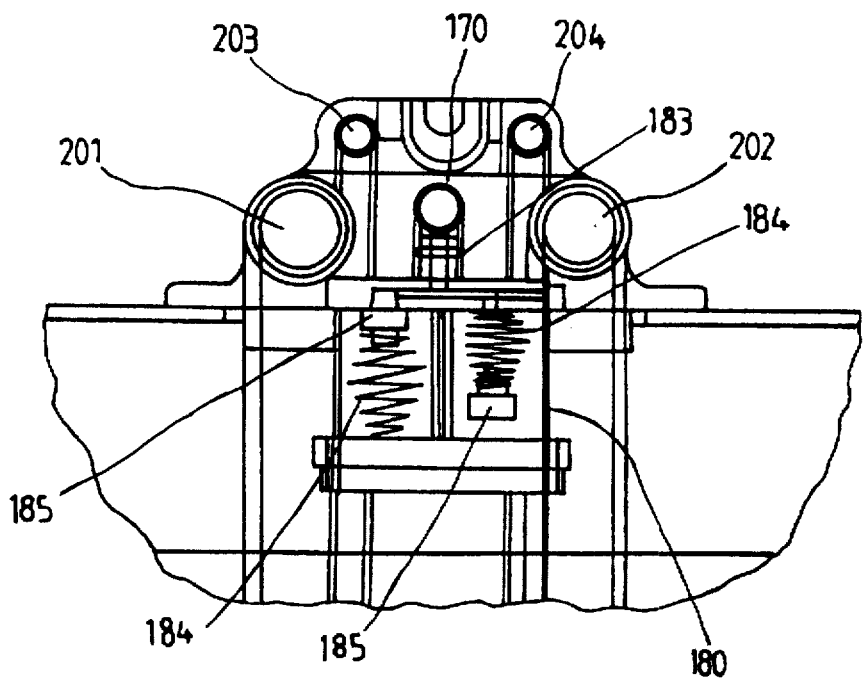
FIG. 7 also illustrates the actions of the base and the air discharge valve.
Figures 8, 8A:
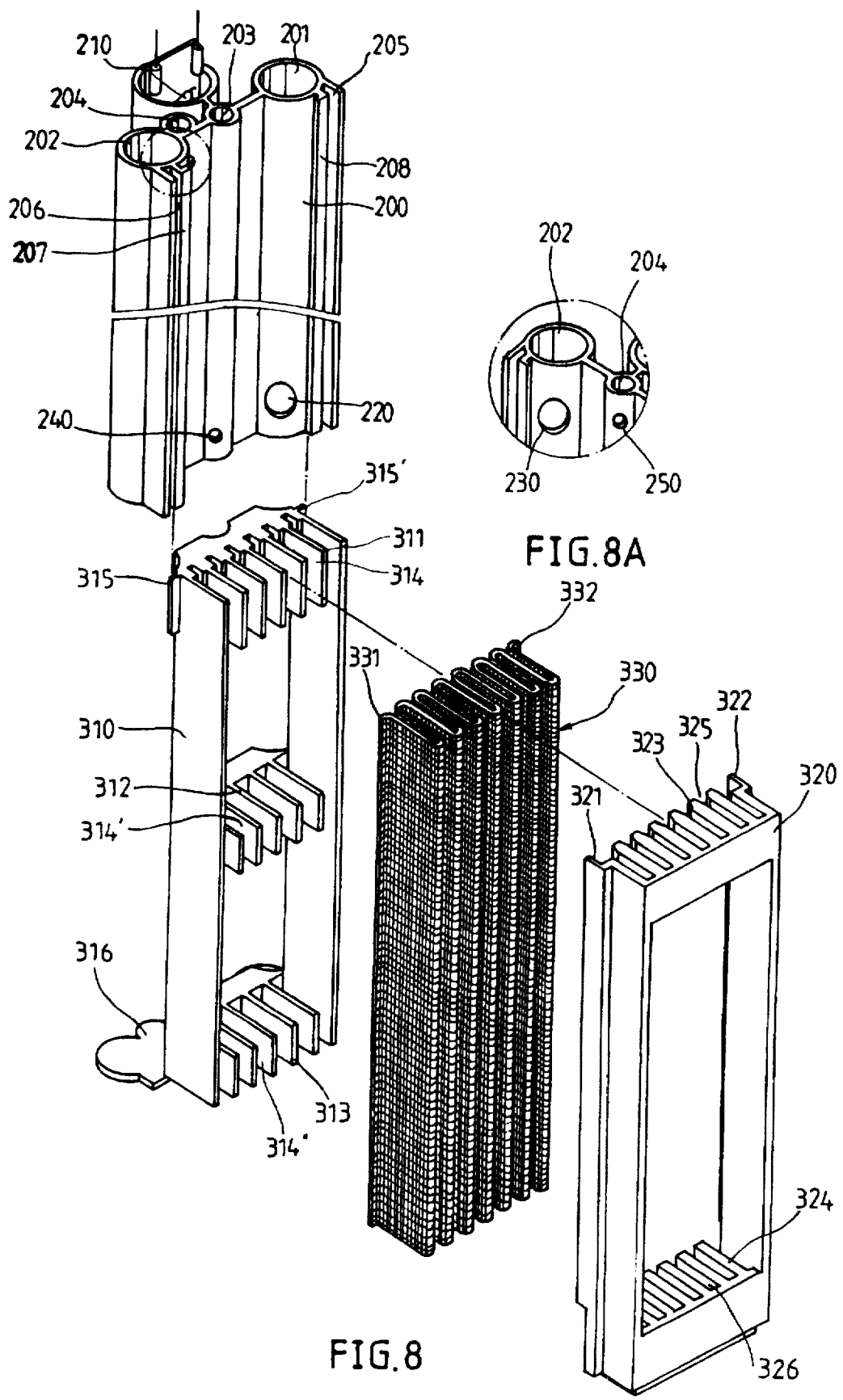
FIG. 8 is an exploded view of the filter means.
FIG. 8a is an enlarged portion of the upper section of the metal conduit showing an oil return hole.

With reference to FIGS. 1, 5, and 8, the filter mesh means 300 includes a lower seat 310, an upper seat 320, a filter mesh 330. The lower seat 310 is provided with a plurality of partitions 311, 312 and 313 respectively at its upper, middle and lower portions so as to form clamping grooves 314, 314' and 314" respectively. The filter 330 is bent into a wavy form and fitted on the partitions 311, 312 and 313 of the lower seat 310. Two end rims 331 and 332 of the filter 330 are mounted on the outer rim pieces 315 and 315'. By means of two L-shaped securing plates 321 and 322 disposed at both sides of the upper seat 320 respectively and two clamping plates 323 and 324 at the upper and lower ends of the upper seat 320 respectively, the partitions 311, 312 and 313, the clamping grooves 314, 314' and 314", the clamping plates 323 and 324, and the grooves 325 and 326 may be inter-clamped. Then the upper seat 310 and the lower seat 320 are joined as a whole by means of high frequency waves. In this way, the filter means 330 of the invention achieves a dimensional and wavy or pleated structure to increase the filter area and prevent blocking by impurities or dirt. Furthermore, the filter means 300 is mounted on the metal conduit 200. Since the metal conduit 200 is provided with the large oil intake hole 201, the large oil return hole 202, the small oil intake hole 203 and the small oil return hole 204, and since the two sides of the metal conduit 200 are provided with respective retain grooves 205 and 206 which respectively have inverted L-shaped retain plates 207 and 208 disposed at the inner sides thereof, after the L-shaped securing plates 321 and 322 of the upper seat 320 are fitted into the retain grooves 205 and 206, by pushing inwardly the outer rim pieces 315 and 315' of the lower seat 310 are retained on the retain plates 207 and 208, thus positioning the filter means 300 on the metal conduit, with a baffle plate 316 serving as a stop means.

At the lower portion of the large oil intake hole or conduit 201 is provided a first through hole 220 at a suitable position. The small oil intake hole or conduit 203 is provided with a third through hole 240 at a lower portion thereof at a suitable position. Intake oil may flow past the filter mesh 330 and into the oil tank via a second through hole 230 at a suitable position at the lower portion of the large oil return hole or conduit 202 and a fourth through hole 250 at the lower portion of the small oil return hole or conduit 204.

Although the present invention has been illustrated and described with reference to the preferred embodiment thereof, it should be understood that it is in no way limited to the details of such embodiment but is capable of numerous modifications within the scope of the appended claims.

What is claimed is:

1. An oil supply and return tube structure for oil tanks in cars and trucks, comprising:

a base having an upper surface, a lower surface and a side surface, a float hole extending from said upper surface to said lower surface, a large oil intake hole extending from said lower surface to said side surface, a large oil return hole extending from said lower surface to said side surface, a small oil intake hole extending from said lower surface to said side surface, a small oil return hole extending from said lower surface to said side surface, a securing screw hole extending from said upper surface to said lower surface, and an air inlet extending from said lower surface to said side surface, said base further having a first screw rod threadedly engaged with the float hole and extending downwardly from said lower surface, a second screw rod threadedly engaged with said large oil return hole and extending downwardly from said lower surface, a third screw rod threadedly engaged with said small oil return hole and extending downwardly from said lower surface, and a fourth screw rod extending through said securing screw hole;

an oil intake rod, an oil return rod and an air intake rod extending outwardly from said side surface and being connected to said small oil intake hole, said small oil return hole, and said air inlet, respectively;

and an air discharge valve connected to said air inlet and extending downwardly from said lower surface;

a sensor for detecting a level of oil in said tank, a sinuous tube fastened in said float hole at said upper surface for protecting said sensor, and cap means for connecting said sinuous tube to said float hole;

metal conduit means secured to and extending downwardly from the lower surface of said base by a hollow securing rod and said securing screw, said metal conduit means further having a float conduit receiving said hollow securing rod, and a large oil intake conduit communicating with said large oil intake hole, a large oil return conduit receiving said second screw rod and communicating with said large oil return hole, a small oil intake conduit receiving said third screw rod and communicating with said small oil intake hole, and a small oil return conduit communicating with said small oil return hole, wherein each said conduit includes a through hole in a respective peripheral wall thereof;

a filter means for covering the through holes of said conduits, said filter means comprising a lower seat connected to said conduit means, an upper seat connected to said lower seat, and a pleated filter mesh clamped between said lower seat and said upper seat;

wherein upper and lower sides of said lower seat include a plurality of clamping grooves, said filter mesh being disposed in said plurality of clamping grooves and being clamped in said clamping grooves by a plurality of clamping plates of said upper seat, and wherein sides of said filter mesh are clamped within retaining grooves located on sides of said metal conduit means by L-shaped securing plates located on sides of said upper seat;

means for joining together said upper seat and said lower seat; and a float provided on said float shaft of said metal conduit, said float being integrally formed from foam rubber and having a C-shaped groove slidingly fitted about said float shaft, said float further having a hole at either side of a front rim of a top portion thereof, said hole accommodating therein a magnet, each said magnet being sealed within a respective hole using an epoxy resin, wherein said float is used in combination with said sensor, wherein said sensor is located within said float conduit and is responsive to a position of said magnets carried by said float for detecting the level of oil in said oil tank;

whereby said filter means filters impurities from said oil; and said metal conduit allows oil to flow into and out of said tank.

2. An oil supply and return valve structure as claimed in claim 1, wherein said air discharge valve is provided with a nozzle disposed in said air inlet and a sealing ring for sealing said nozzle to said air inlet, said valve further including a conical ring and a piston arranged to control air pressure in said oil tank.

* * * * *